United States Patent [19]

Riordan et al.

[11] 4,010,344

[45] Mar. 1, 1977

[54] APPARATUS FOR TRANSFERRING A WORKPIECE OVER A ROUGH SURFACE

[75] Inventors: Edward D. Riordan, Hillsborough; John R. Menges, Bricktown, both of N.J.

[73] Assignee: Joyal Products, Incorporated, Linden, N.J.

[22] Filed: Mar. 28, 1975

[21] Appl. No.: 563,145

[52] U.S. Cl. .................................. 219/80; 219/79; 219/103; 219/158

[51] Int. Cl.$^2$ ........................................... B23K 9/12

[58] Field of Search ................ 219/79, 80, 87, 103, 219/158, 159

[56] References Cited

UNITED STATES PATENTS

| | | | |
|---|---|---|---|
| 2,915,616 | 12/1959 | Griffin | 219/159 X |
| 3,509,309 | 4/1970 | Lindsay et al. | 219/103 X |

*Primary Examiner*—Arthur T. Grimley

*Assistant Examiner*—N. D. Herkamp

*Attorney, Agent, or Firm*—Lerner, David, Littenberg & Samuel

[57] ABSTRACT

Apparatus for joining a first workpiece from a supply station to a second workpiece at a work station which accurately positions the first workpiece in engagement with the second workpiece at a predetermined location spaced from the periphery of the second workpiece. Positioning means are provided for transferring the first workpiece from the supply station to the work station in a manner such that the first workpiece is spaced from the second workpiece during such transfer until it is moved to the predetermined location in engagement with the second workpiece. The positioning means includes a transfer guide and a transfer device for transferring the first workpiece along the transfer guide to the work station.

19 Claims, 12 Drawing Figures

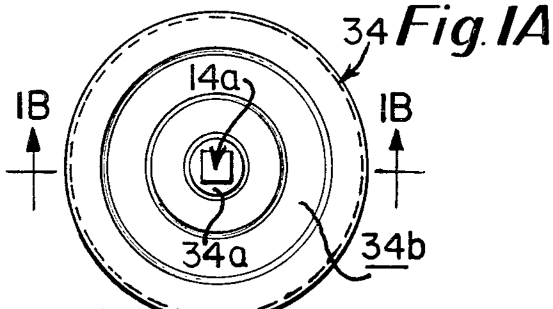
Fig. 1A
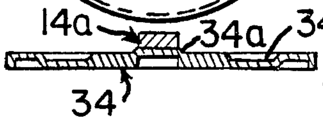
Fig. 1B
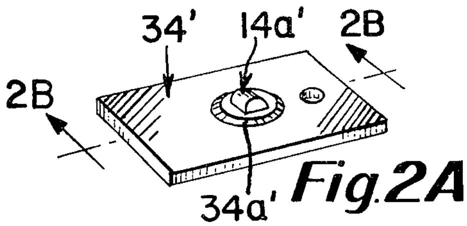
Fig. 2A
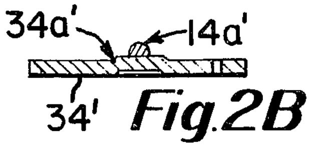
Fig. 2B
Fig. 3.
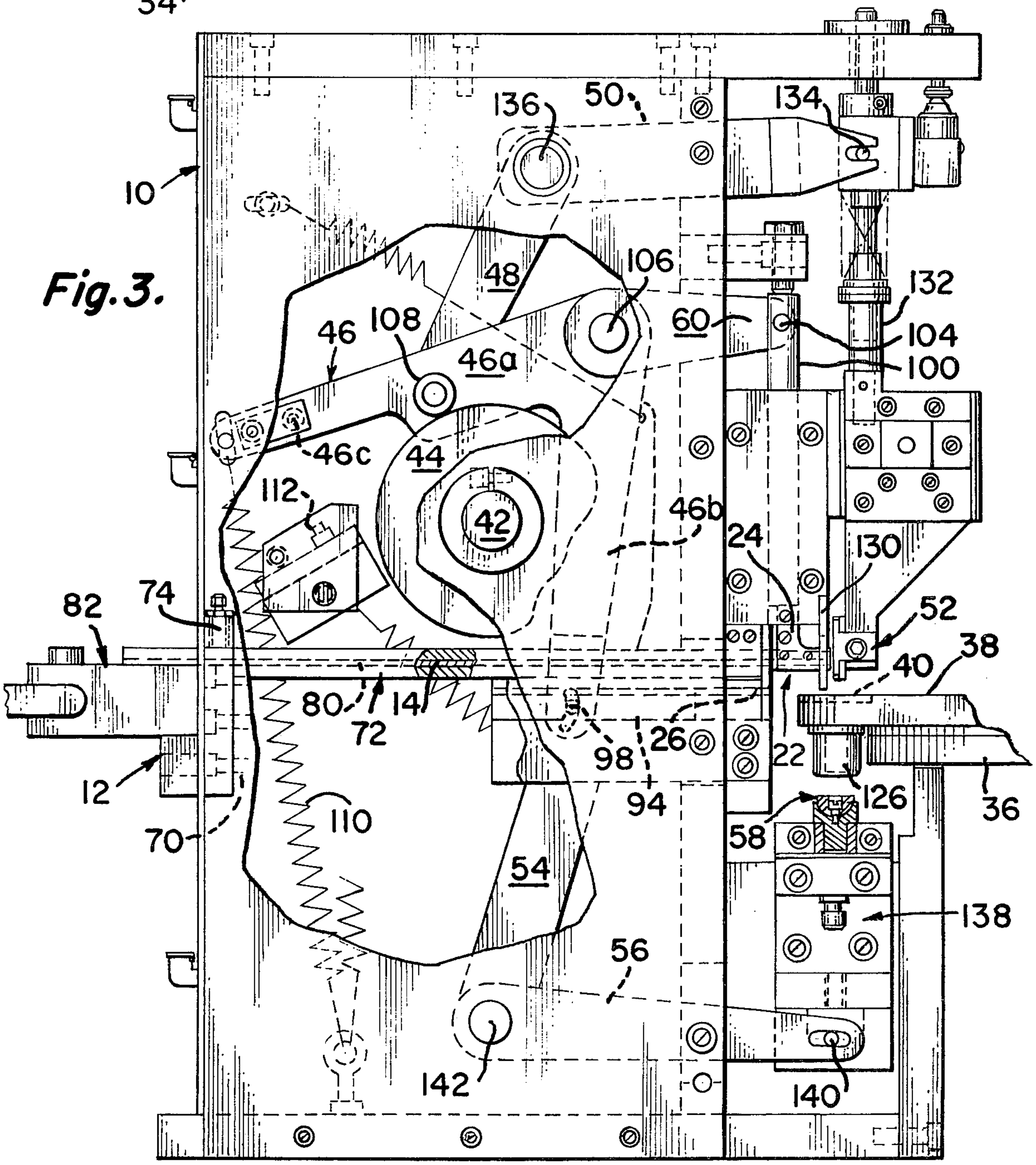

APPARATUS FOR TRANSFERRING A WORKPIECE OVER A ROUGH SURFACE

FIELD OF THE INVENTION

This invention relates to apparatus for feeding and transferring a workpiece from a supply station to a work station and, in particular, to such apparatus specifically constructed to transfer a workpiece over a rough surface so that it may be accurately positioned at a work station.

BACKGROUND OF THE INVENTION

In many situations, a workpiece must be transferred between various stations in an environment in which there are obstacles to the workpiece being transferred. For example, in manufacturing switches, such as those used in burglar alarm systems, the switch includes a spring diaphragm and an armature and it is necessary to attach an electrical contact to each of these switch parts at a precise location so that when installed a proper electrical connection can be made between the switch parts when actuated. However, in order to attach the electrical contact, it must first be transferred to a precise location on the switch part and be maintained at that precise location while it is being attached. The problem which arises, however, is that the spring diaphragm and/or armature typically include ridges and/or depressions surrounding the precise location at which the electrical contact is to be attached. These ridges and depressions form a rough surface and present obstacles to transfer apparatus for simply sliding the electrical contact into position. In addition, once the electrical contact is accurately positioned on the spring diaphragm or armature, it must be maintained in the proper position while a welding operation is performed to weld the elements together.

Accordingly, it is necessary to provide transfer apparatus which will allow workpieces, such as electrical contacts, to be transferred from a supply station to a work station where an operation is to be performed on the workpieces, such as welding, without the ridges and/or depressions of other workpieces at the work station, such as the switch parts, interrupting the transfer of the electrical contacts to their precise location on the switch parts. In addition, there are situations in which the configuration of the work station itself may present obstacles to the transfer of the workpiece to the work station and it is necessary to provide transfer apparatus to avoid such obstacles.

Accordingly, it is an overall objective of the present invention to provide apparatus which is adapted to receive a workpiece and positively transfer it from a supply station to a work station where it is to be worked on without the configuration of the work station or the configuration of other workpieces at the work station interferring with such transfer operation.

In addition, it is also an objective of the present invention to provide apparatus which insures that the transferred workpiece is accurately positioned at a precise location at the work station and is maintained at that precise location while it is being worked on.

SUMMARY OF THE INVENTION

Briefly, in accordance with the principles of the present invention, apparatus for feeding and transferring workpieces is provided, including means for accurately positioning workpieces at a predetermined location, which accomplishes the above-mentioned objectives. More particularly, the apparatus includes a feeding assembly for continuously feeding stock material to be cut to a cutting station through a feeding guide which is adapted to receive and guide the stock material to the cutting station. Preferably, the feeding assembly is also provided with means for advancing the stock material through the feeding guide with the advancing means being adjustable so as to feed different lengths of stock material to the cutting station. At the cutting station, there is provided a cutting assembly for cutting a workpiece of desired length from the continuously fed stock material. More specifically, the advancing means is adjusted to feed the desired length of stock material into the cutting station so that when the cutting assembly is operated, it will cut the stock material to form a workpiece of desired length. Preferably, the cutting assembly includes a transfer housing having a cutter mounted therein which operates to support the cut workpiece and is constructed and arranged to be movable so as to transfer the cut workpiece from the cutting station to a transfer station. At the transfer station there is provided a transfer assembly which transfers the workpiece from the transfer housing at the transfer station to a work station. Preferably, the transfer assembly includes a transfer device and a transfer guide for guiding the workpiece as it is transferred along the transfer guide by the transfer device which is adapted to enter the transfer housing and transfer guide, engage the workpiece, and transfer the workpiece from the transfer housing, along the transfer guide to the work station.

In the preferred embodiment, the transfer housing and guide are substantially enclosed and provide a smooth and accurately defined pathway between the transfer station and the work station. In this manner, the enclosed path allows the workpiece to be transferred between stations without interference from any obstacles, such as the configuration of the work station or the configuration of other workpieces at the work station. Moreover, the enclosed transfer guide is constructed and arranged so that when the workpiece exits therefrom, it will be accurately positioned at a precise location at the work station.

At the work station, any type of apparatus may be employed to perform an operation on the workpiece. For purposes of illustrating the features of the present invention only, welding apparatus is provided at the work station which is adapted to weld the transferred workpiece such as an electrical contact, to another workpiece, such as a switch part. The apparatus of the present invention also includes a guide and stop assembly at the work station, in order to insure that the workpiece which has been transferred to the work station and positioned at a precise location by the enclosed transfer guide is maintained at that precise location while an operation is being performed on the workpiece. Preferably, the guide and stop assembly forms a continuation of the enclosed transfer guide and includes a stop member to insure that the workpiece is transferred by the transfer device to the desired predetermined location at the work station, and further insures that the workpiece is maintained at its precise location.

Further objects, features and advantages of the present invention will become apparent upon a consideration of the following detailed description of a presently preferred embodiment when taken in conjunction with the accompanying drawing, wherein:

FIGS. 1A and 1B are a perspective and cross-sectional view of two joined workpieces respectively, used to illustrate the operation of the apparatus of the present invention;

FIGS. 2A and 2B illustrate an alternative construction of two joined workpieces in perspective and cross-section, respectively, for illustrating the operation of the apparatus of the present invention;

FIG. 3 is a side elevational view, partially broken away, illustrating an overall view of a machine which incorporates the apparatus of the present invention;

GENERAL DESCRIPTION OF MACHINE

Figure 4:
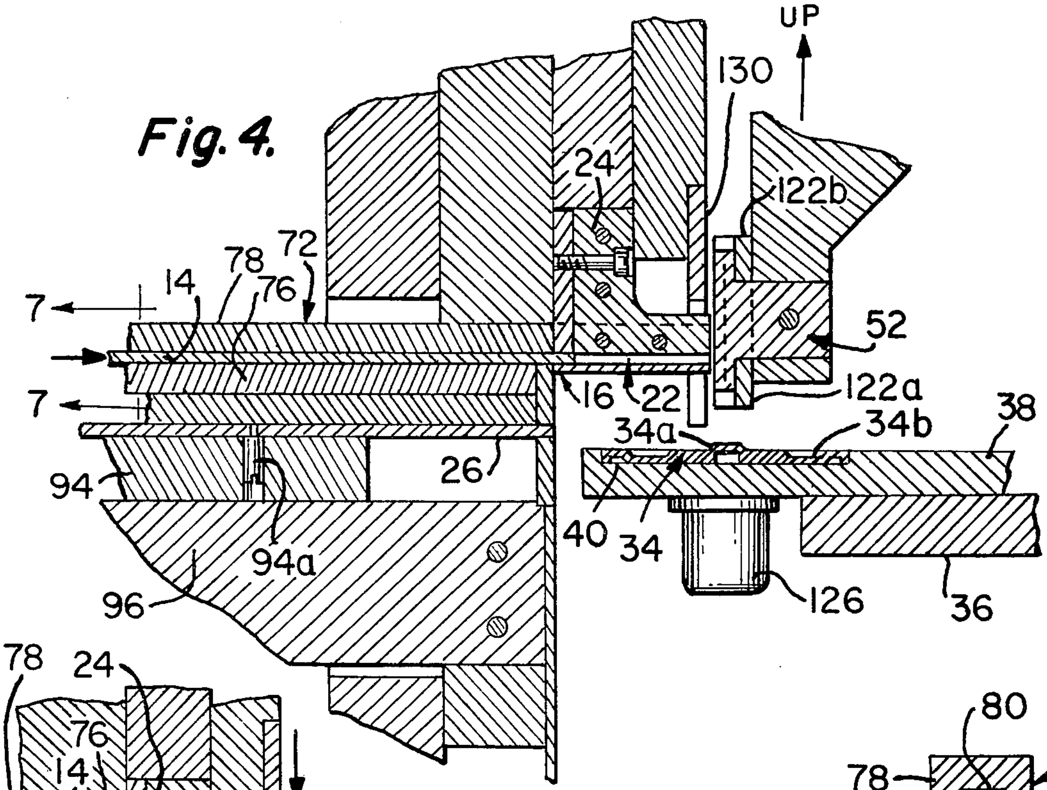
FIG. 4 is an enlarged cross-sectional view in detail of the feeding assembly, cutting assembly, transfer assembly, and stop assembly of the apparatus of the present invention with the stock material to be cut located at the cutting station.

The machine 10 incorporating the features of the present invention includes the following sub-assemblies: a feeding assembly 12 for continuously feeding continuous stock material 14 to a cutting station 16; a cutting assembly 18 at cutting station 16 adapted to receive stock material 14 and cut off therefrom a workpiece **14*a* of desired length and transfer it to a transfer station 20; a transfer assembly 22 including a transfer guide 24 and a transfer device 26 for transferring cut workpiece 14*a* along transfer guide 24 to a work station 28; and apparatus 30 at work station 28 which includes a guide and stop assembly 32 which forms a continuation of transfer guide 24 and insures that workpiece 14*a* is precisely positioned and maintained at work station 28 while apparatus 30** is performing an operation on it.

For purposes of illustrating the features of the present invention, apparatus 30 is illustrated as a welding apparatus which performs a welding operation on workpiece **14*a* by welding it to a predetermined location spaced from the periphery of an additional workpiece 34, for example, located at work station 28. The apparatus of the present invention is portable and may be used in conjunction with any type of feeding operation for supplying workpieces 34 to work station 28. For example, workpieces 34 may be manually supplied to work station 28 in order to be worked on, or a straight line conveyor may be employed to supply workpieces 34 to work station 28, or a rotary dial feed arrangement may be employed to supply workpieces 34 to work station 28, as is partially illustrated in the present case. As shown in the drawing, and for purposes of illustration only, a rotating turret 36 is provided with a circular-shaped work table 38 rigidly connected to the upper surface thereof. Work table 38 includes a plurality of nests or depressions 40 at a plurality of locations about the periphery of work table 38. Each nest 40 is adapted to receive a workpiece 34 so that each time turret 36 is indexed, a new workpiece 34 is brought into position at work station 28**.

Machine 10 is provided with cam and follower drives for actuating cutting assembly 18, transfer assembly 22 and the welding apparatus 30. As shown most clearly in FIG. 3, a common shaft 42 has a plurality of cams mounted thereon, with only a cam 44 being illustrated. In machine 10, there are four such cams and cam followers for operating the apparatus. For example, cam 44 is engaged by a bell crank 46, which as will be explained in further detail, controls the movement of transfer device 26 of transfer assembly 22. A second cam (not shown) mounted on common shaft 42 controls the operation of follower and lever arms 48, 50 which control the vertical movement of an upper electrode 52 of welding apparatus 30. Similarly, a third cam (not shown) also mounted on common shaft 42 controls the operation of follower and lever arms 54, 56 which control the vertical movement of a lower electrode 58 of welding apparatus 30. A fourth cam (not shown) mounted on common shaft 42 controls the operation of a lever arm 60 which controls the vertical movement of cutting assembly 18 and transfer guide 24 of transfer assembly 22, as will be more fully explained. Common shaft 42 may be rotated by any conventional drive system, such as a motor (not shown).

Before turning to a detailed description of the subassemblies of machine 10 incorporating the features of the present invention, a brief description of the types of workpieces which may employ the apparatus of the present invention will be given. As shown most clearly in FIG. 1, there is a spring diaphragm or workpiece 34 having a series of ridges **34*a* and depressions 34*b* formed therein, with another workpiece or electrical contact 14*a* which is welded at the precise center of workpiece 34 on ridge 34*a*. Similarly, in FIG. 2 there is shown another type of workpiece 34', such as an armature, having a ridge 34*a*' on which another workpiece or electrical contact 14*a*' is welded. As can be seen from the configuration of workpieces 34, 34', the rough surfaces formed by the ridges and depressions make it difficult, if not impossible, for conventional apparatus to accurately position electrical contacts 14*a*, 14*a*', on respective workpieces 34, 34'. More particularly, if a simple transfer arm were employed to slide workpiece 14*a* to the predetermined central location where it is to be welded on workpiece 34, the transfer arm and/or workpiece 14*a* would engage ridges and/or depressions 34*a*, 34*b* which form obstacles to the positioning of workpiece 14*a* on central ridge 34*a***.

Accordingly, specially constructed apparatus is required where the workpieces at a work station and/or the work station itself provide obstacles to the use of a simple transfer arm for transferring and accurately positioning workpieces at a work station. The apparatus of the present invention has been developed to overcome these difficulties and allows a workpiece to be transferred and positioned by avoiding any obstacles in the area of the work station, such as rough surfaces illustrated by workpieces 34, 34' in FIGS. 1 and 2. The apparatus of the present invention operates to accurately position workpiece 14*a* in engagement with workpiece 34 at a predetermined location, such as ridge 34*a*, spaced from the periphery of workpiece 34.

DESCRIPTION OF FEEDING ASSEMBLY

Figure 7:
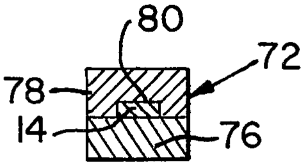
FIg. 7 is an enlarged vertical cross-sectional view of the feeding guide of the feeding assembly, taken along lines 7—7 in FIG. 4 and looking in the direction of the arrows, illustrating the structure of the feeding guide for continuously feeding stock material.

Feeding assembly 12 which may be bolted to machine 10 by suitable bolts 70 includes a longitudinally extending feeding guide 72 which extends from the left side of machine 10 shown in FIG. 3 all the way to cutting station 16. Feeding guide 72 is removably connected to feeding assembly 12, such as by a bolt 74, so that feeding guide 72 may be interchanged with different sized guides for feeding stock material of different dimensions. As shown in detail in FIG. 7, feeding guide 72 includes a base 76 having superimposed thereon an inverted U-shaped member 78 to form a tunnel or guide 80 therebetween to feed conventional stock material 14. In order that feeding guide 72 may be employed to feed stock material having a wide range of dimensions, U-shaped member 78 is removably connected to base 76 by suitable means, such as bolt 74. In this manner, U-shaped members 78 having different sized tunnels or guides 80 may be employed to accommodate different size stock materials, such as 14 or 14'. Of course, feeding guide 72 may be integrally formed as a unit, instead of employing two members, so that the entire feeding guide 72 would be replaced to accommodate different size stock material. Tunnel or guide 80 must always be of sufficient width and height to allow stock material 14 to be easily fed therethrough to cutting station 16.

Feeding assembly 12 is also provided with conventional advancing apparatus (partially shown at 82) for continuously advancing continuous stock material 14 along tunnel 80 to cutting station 16. Of course, advancing apparatus 82 may be adjustable so that different lengths of stock material 14 may be fed into cutting station 16 so that different length workpieces 14*a* may be cut from continuous stock material 14.

DESCRIPTION OF CUTTING ASSEMBLY

Figure 8:
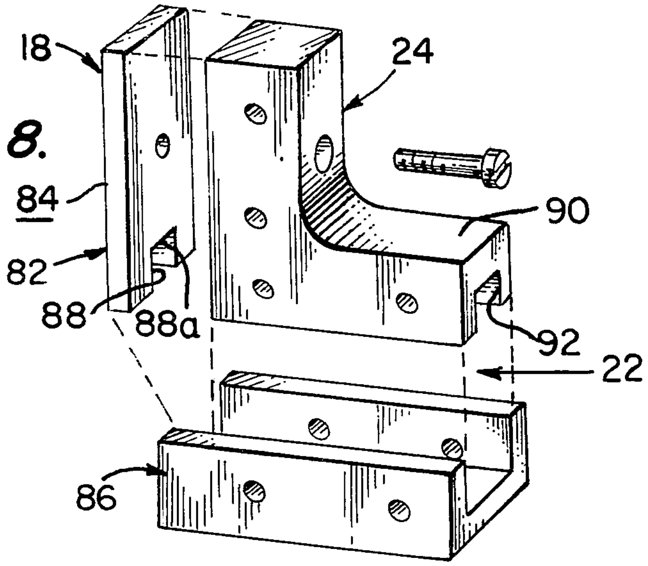
FIG. 8 is an exploded perspective view illustrating the details of the cutting assembly and transfer guide of the transfer assembly of the present invention.

At cutting station 16 there is a cutting assembly 18 which operates to receive stock material 14 from feeding guide 72 and cut off from stock material 14 a workpiece 14*a* of desired length. Cutting assembly 18 is shown most clearly in FIG. 8 and includes a transfer housing 82 having an upper U-shaped member 84 and a lower U-shaped member 86. Member 84 includes a cutout 88 formed therein which is sharpened at its upper edge to form a cutter 88*a*. The lower end of member 84 is constructed and arranged to be nested within the lower U-shaped member 86 so that cutout 88 is completely enclosed to form a cutting tunnel or guide which forms a continuation of tunnel 80 in feeding guide 72 when cutting assembly 18 is in its upper position at cutting station 16.

In operation, if cut workpiece 14*a* is to be, for example, an eighth of an inch long, adjustable advancing apparatus 82 operates to feed or insert an eighth of an inch of stock material 14 beyond feeding guide 72 and into cutting tunnel 88 of cutting assembly 18, as shown in FIG. 4. Of course, the length of the cut off workpiece 14*a* may be varied by simply adjusting advancing apparatus 82 to feed the desired length of stock material 14 into cutting tunnel 88. In operation, cutter assembly 18 is moved downwardly from cutting station 16 to a transfer station 20 and thereby operates to cut off the end of stock material 14 to form workpiece 14*a* which is held in place within cutting tunnel 88 as cutting assembly 18 moves downwardly to transfer station 20. As shown most clearly in FIG. 5, when cutting assembly 18 is actuated downwardly to transfer station 20, cutting tunnel 88 is in line with transfer device 26, so that workpiece 14*a* is ready to be transferred by transfer device 26 along transfer guide 24 to work station 28.

DESCRIPTION OF TRANSFER ASSEMBLY

Figure 5:
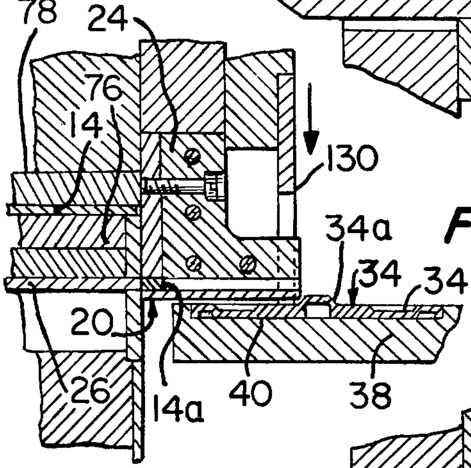
FIG. 5 is an enlarged cross-sectional view of the apparatus with the cutting assembly at the transfer station and the cut workpiece ready to be transferred to the work station by the transfer device of the transfer assembly.
Figure 6:
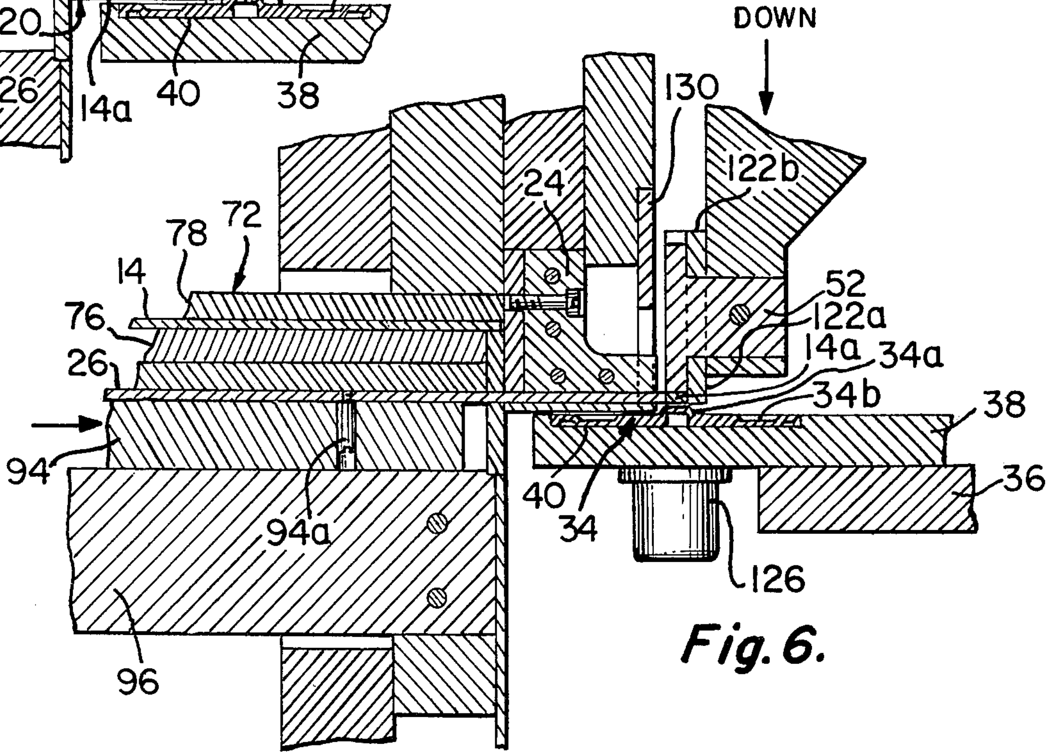
FIG. 6 is an enlarged cross-sectional view of the apparatus illustrating the workpiece at the work station with the transfer assembly ready to be retracted and the stop assembly in position.

Transfer assembly 22 operates to transfer workpiece 14*a* from transfer station 20 to work station 28 and includes a transfer guide 24 and a transfer device 26, which as shown most clearly in FIGS. 5 and 6, operates to engage and move workpiece 14*a* along transfer guide 24 to work station 28. As shown in detail in FIG. 8, transfer guide 24 includes an upper L-shaped member 90 which is constructed and arranged to be nested within lower U-shaped member 86. Member 90 includes a longitudinally extending cutout which when nested with member 86 forms a transfer tunnel 92 which is a continuation of cutting tunnel 88. Upper U-shaped member 84, lower U-shaped member 86 and upper L-shaped member 90 are each formed as separate components which are adapted to be bolted together and be actuated as an integral unit from cutting station 16 to transfer station 20. However, it will of course be understood that these three components can be manufactured in one piece, or even in two pieces, or cutting assembly 18 may be actuated by itself with transfer guide 24 remaining stationary at transfer station 20. The controlling factor is that when cutting assembly 18 is in its upper position, cutting tunnel 88 is in alignment with feeding guide 80, and when cutting assembly 18 is actuated downwardly to its lower position, cutting and transfer tunnels 88, 92 are in alignment with transfer device 26. As briefly explained above, cutting assembly 18 and transfer guide 24 are moved as a unit between cutting station 16 and transfer station 20, and as may be seen in FIG. 3, are connected to a shaft 100 which is actuated in a vertical direction by a lever arm 60 to which it is pivotally connected at 104.

Figure 10:
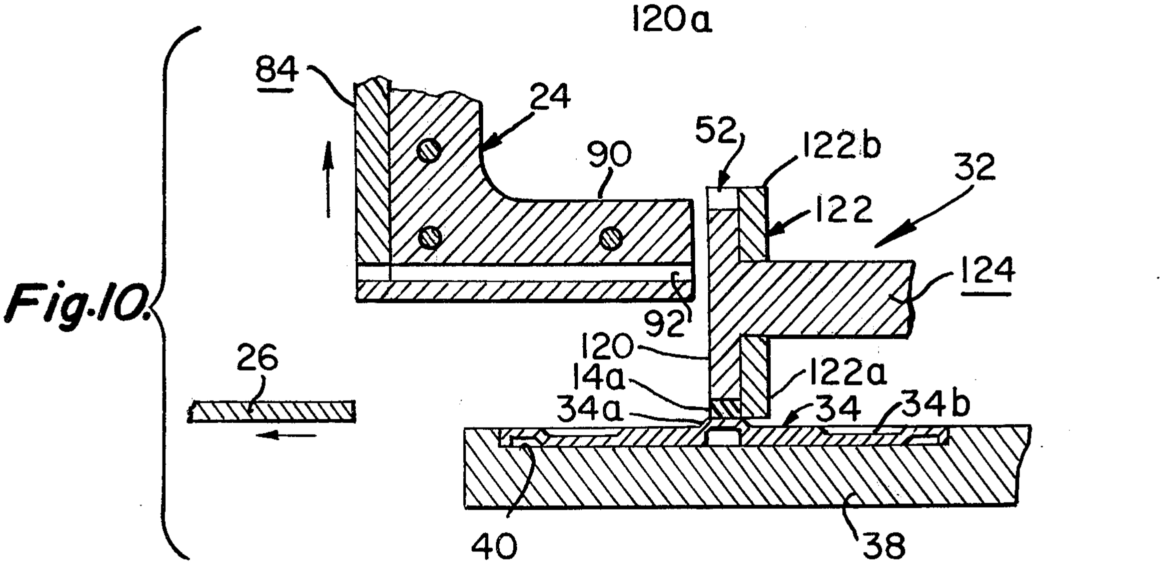
FIG. 10 is an enlarged cross-sectional view of the apparatus of the present invention illustrating the workpiece at the work station after the transfer assembly has been retracted and the stop assembly in position.

Transfer assembly 22 also includes transfer device 26 which is fixedly connected to a slide 94, such as by a bolt 94*a*, with transfer device 26 and slide 94 being longitudinally slidable within a housing 96. Slide 94 is connected to and actuated by bell crank 46 (See FIG. 3) which is controlled by cam 44 mounted on common shaft 42, as explained above. Slide 94 may be connected to bell crank 46 in any suitable manner, such as by a pin and slot connection 98. In this manner, actuation of slide 94 operates to extend transfer device 26 into cutting and transfer tunnels 88, 92, as shown in FIG. 6, to transfer workpiece 14*a* to work station 28. Once workpiece 14*a* has been properly positioned at work station 28, slide 94 operates to retract transfer device 26 from cutting and transfer tunnels 88, 92, as shown in FIG. 10, so that cutting assembly 18 and transfer guide 24 may be retracted upwardly from transfer station 20 back to cutting station 16 so as to be ready to receive and cut the next workpiece 14*a*.

Bell crank 46 includes arms 46*a*, 46*b* and is pivoted at 106 with follower arm 46*a* having a cam follower 108 mounted thereon which is controlled by cam 44, mounted on common shaft 42, as explained above. The other end of follower arm 46*a* is connected by a spring 110 to the frame of machine 10 which operates to maintain follower arm 46*a* always urged in engagement with cam 44. In operation, as cam 44 rotates in a clockwise direction, follower arm 46*a* and cam follower 108 eventually engage a low spot on cam 44, so that follower arm 46*a* is pivoted in a counterclockwise direction about pivot 106 and arm 46*b* operates to actuate slide 94 and transfer device 26 into cutting and transfer tunnels 88, 92. As cam 44 continues its clockwise rotation, follower arm 46 and cam follower 108 engage a high spot on cam 44, so that follower arms 46*a*, 46*b* are rotated in a clockwise direction about pivot 106, and operate to retract slide 94 and transfer device 26 from cutting and transfer tunnels 88, 92. In this manner, there is a positive retraction of transfer device 26 by the cam-operated arm 46*b*. Accordingly, this arrangement insures that transfer device 26 will always be retracted before cutting assembly 18 and transfer guide 24 are actuated upwardly and avoids a jam-up or malfunction with the cutting assembly 18 and transfer guide 24 breaking or damaging transfer device 26. Moreover, follower arm 46*a* is provided with adjustment screws 46*c* mounted on one end thereof and which are adapted to engage a microswitch 112 indicating that transfer device 26 is extended all the way into transfer tunnel 92 and that workpiece 14*a* is properly positioned at work station 28. If adjustment screws 46*c* do not engage microswitch 112, it indicates that transfer device 26 and workpiece 14*a* have jammed in transfer tunnel 92, and machine 10 will shut off and a warning signal operates to indicate a machine malfunction.

DESCRIPTION OF GUIDE AND STOP ASSEMBLY

Figure 9:
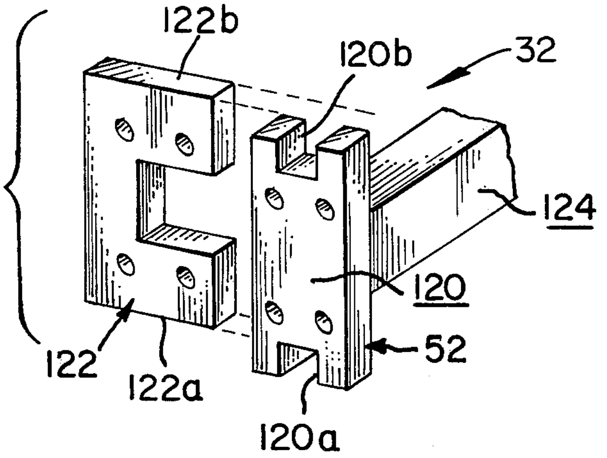
FIG. 9 is an exploded perspective view illustrating the details of the stop assembly located at the work station.

Guide and stop assembly 32 is provided at work station 28 and operates in conjunction with welding apparatus 30 to properly position workpiece 14*a* relative to workpiece 34 and to assure that transfer device 26 positions workpiece 14*a* at the desired predetermined location spaced from the periphery of workpiece 34. More particularly, welding apparatus 30 includes an upper welding electrode 52 and a lower welding electrode 58 with turret 36 being movable into position therebetween. As shown most clearly in FIG. 9, upper electrode 52 is provided with a cutout or guide 120*a* adapted to form a continuation of transfer guide 24 and receive workpiece 14*a* as it moves out of transfer guide 24. However, the forward momentum of transfer device 26 may operate to transfer workpiece 14*a* beyond the desired location. Accordingly, a U-shaped stop member 122 is provided and is arranged to straddle an extension member 124, which forms a part of upper electrode 52. In this manner, the lower leg 122*a* of U-shaped stop member 122 closes off one side of guide 120*a* to insure that workpiece 14*a* is positioned at the desired location at the center of workpiece 34. Upper electrode 52 is rotatable so that upper guide 120*b* and upper leg 122*b* may also be employed as a guide and stop assembly for different sized workpieces.

Upper electrode 52 is vertically movable and moves into a position where it is centered above the central ridge 34*a* of workpiece 34 so that guide 120*a* and stop member 122*a* form a closed end tunnel to receive workpiece 14*a* and precisely locate it at a central position relative to workpiece 34. Transfer device 26 which slides workpiece 14*a* along transfer guide 24 does not enter guide 120*a* which is only large enough to receive workpiece 14*a*, as shown most clearly in FIG. 6. Once workpiece 14*a* has been received within guide 120*a*, upper electrode 52 is moved further downwardly and into contact with workpiece 14*a* so as to clamp it in the desired position relative to workpiece 34. In this manner, when transfer device 26 is retracted along transfer guide 24, the clamping of workpiece 14*a* by upper electrode 52 operates to prevent workpiece 14*a* from sticking to transfer device 26 and being pulled out of its centerized position.

Of course, if workpieces 14*a*′ and 34′ are to be joined together, the size of feeding guide 80, cutting tunnel 88, transfer guide 92 and guide 120 must be modified to transfer and position the different size workpieces.

As shown in FIG. 10, once transfer device 26 is retracted from cutting and transfer tunnels 88, 92, cutting assembly 18 and transfer guide 24 may be retracted to the upper position so that the welding operation may be performed on the workpieces. In the particular embodiment shown, lower electrode 58 moves up into engagement with a conducting element 126. All members between upper and lower welding electrodes 52, 58 are electrically conductive to complete an electrical circuit for heating the elements and welding workpiece 14*a* to workpiece 34. After the welding operation is completed, upper and lower electrodes 52, 58 are retracted to allow turret 36 to index the next workpiece 34 and work station 40 into position between electrodes 52, 58. A stripper element 130 is provided to hold workpiece 34 in position within work station 40 and thereby prevent workpiece 14*a* from sticking to upper electrode 52 when it is retracted. After electrodes 52, 58 are retracted and turret 36 is indexed, the next workpiece 34 is in position to receive the next workpiece 14*a* as transfer device 26 moves it out of transfer guide 92.

As briefly explained above, upper and lower welding electrodes 52, 58 are cam-operated. more particularly, as may be seen in FIG. 3, upper electrode 52 is connected to a vertically movable member 132 which is pivotally connected at 134 to lever arm 50 which is pivotally connected at 136 to follower arm 48 which is driven by one of the four cams (not shown) mounted on common shaft 42. Similarly, lower electrode 58 is connected to a vertically movable member 138 which is pivotally connected at 140 to lever arm 56 which is pivotally connected at 142 to follower arm 54 which is controlled by one of the four cams (not shown) mounted on common shaft 42.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for joining a first workpiece to a second workpiece, said apparatus comprising a supply station for receiving the first workpiece, a work station for receiving the second workpiece, and positioning means for accurately positioning the first workpiece in engagement with the second workpiece at a predetermined location spaced from the periphery of the second workpiece, said positioning means including a transfer guide and a transfer device for transferring the first workpiece along said transfer guide to the work station in a manner such that said transfer guide is between the first workpiece and the second workpiece during the transfer along said transfer guide until the first workpiece is moved to said predetermined location in engagement with the second workpiece.

2. Apparatus in accordance with claim 1 wherein said positioning means further includes guide means at said work station for guiding the first workpiece to said predetermined location.

3. Apparatus in accordance with claim 2 wherein said guide means includes a stop assembly for receiving the first workpiece from said transfer guide.

4. Apparatus in accordance with claim 3 wherein said stop assembly includes an opening in one side thereof for receiving the first workpiece and a stop member for closing the other side of said stop assembly and for limiting the movement of the first workpiece.

5. Apparatus in accordance with claim 3 wherein said stop assembly is constructed and arranged to form a continuation of said transfer guide.

6. Apparatus in accordance with claim 2 wherein said guide means at said work station includes means for welding the first workpiece to the second workpiece.

7. Apparatus in accordance with claim 2 wherein said guide means forms a continuation of said transfer guide and is adapted to receive the first workpiece therefrom.

8. Apparatus in accordance with claim 1 further including a feeding guide for guiding the first workpiece to said supply station and means for advancing the first workpiece along said feeding guide.

9. Apparatus in accordance with claim 8 wherein said advancing means is adjustable so that different lengths of the first workpiece may be fed to said supply station.

10. Apparatus in accordance with claim 8 wherein said feeding guide is removably connected to said apparatus.

11. Apparatus in accordance with claim 1 wherein said transfer guide is constructed to substantially surround the first workpiece as it is transferred to said work station and is adapted to receive said transfer device therein.

12. Apparatus in accordance with claim 1 wherein said transfer device includes an elongated member constructed and arranged to extend into said transfer guide to engage the first workpiece and transfer it along said transfer guide to said work station.

13. Apparatus in accordance with claim 1 wherein said positioning means further includes a movable transfer housing having a cutter mounted therein which operates to cut the first workpiece and transfer it from said supply station to said transfer guide.

14. Apparatus in accordance with claim 13 further including a feeding guide for guiding the first workpiece to said supply station and said transfer housing is constructed and arranged to form a continuation of said feeding guide and is adapted to receive the first workpiece therefrom.

15. Apparatus in accordance with claim 13 wherein said transfer device includes an elongated member constructed and arranged to extend into said transfer housing and said transfer guide to engage the first workpiece and transfer it along said transfer guide to said work station.

16. Apparatus in accordance with claim 1 further including a feeding guide for guiding the first workpiece to said supply station and a transfer housing for supporting the first workpiece during transfer from said supply station to said transfer guide, said transfer housing constructed and arranged to be movable between said supply station where it is in alignment with said feeding guide and said transfer guide where it is in alignment with said transfer device.

17. Apparatus for transferring material between stations comprising:

means for feeding material to a first station, first means for transferring the material in a first direction from said first station to a second station, said first transferring means being movable in said first direction and includes a transfer housing for supporting the material received from said feeding means during transfer from said first station to said second station, second means for transferring the material in a second direction from said second station to a third station, said second transferring means including a transfer guide and a transfer device for transferring the material along said transfer guide to said third station, and said transfer housing at said second station being constructed and arranged to form a continuation of said transfer guide, and said transfer guide being adapted to receive the material from said transfer housing.

18. Apparatus in accordance with claim 17 wherein said transfer device is constructed and arranged to pass through said transfer housing when at said second station and enter said transfer guide which forms a continuation of said transfer housing.

19. Apparatus in accordance with claim 18 wherein said first transferring means and said transfer guide are connected and operate to move as a unit between said first and second stations.

* * * * *